Patented Feb. 16, 1926.

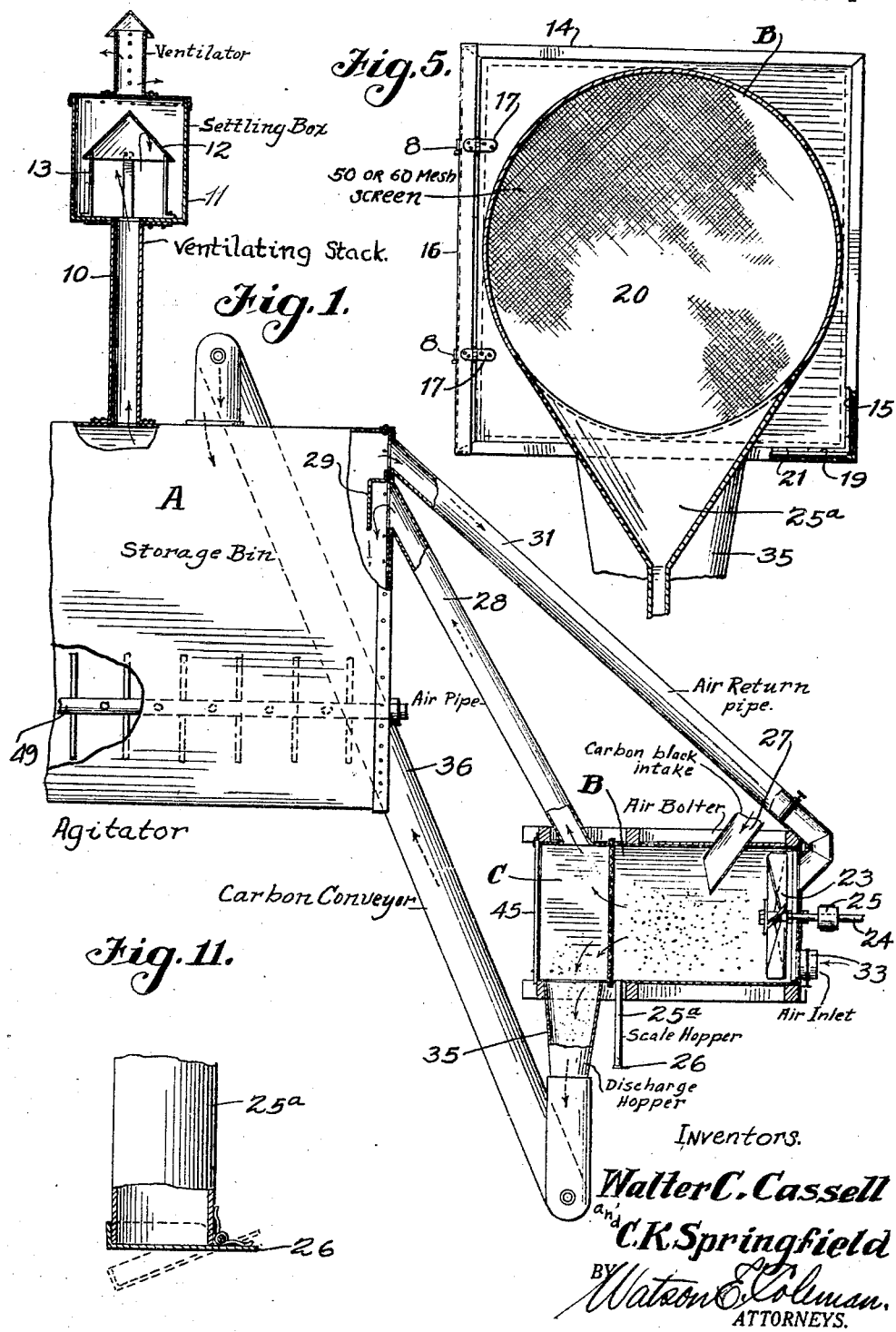

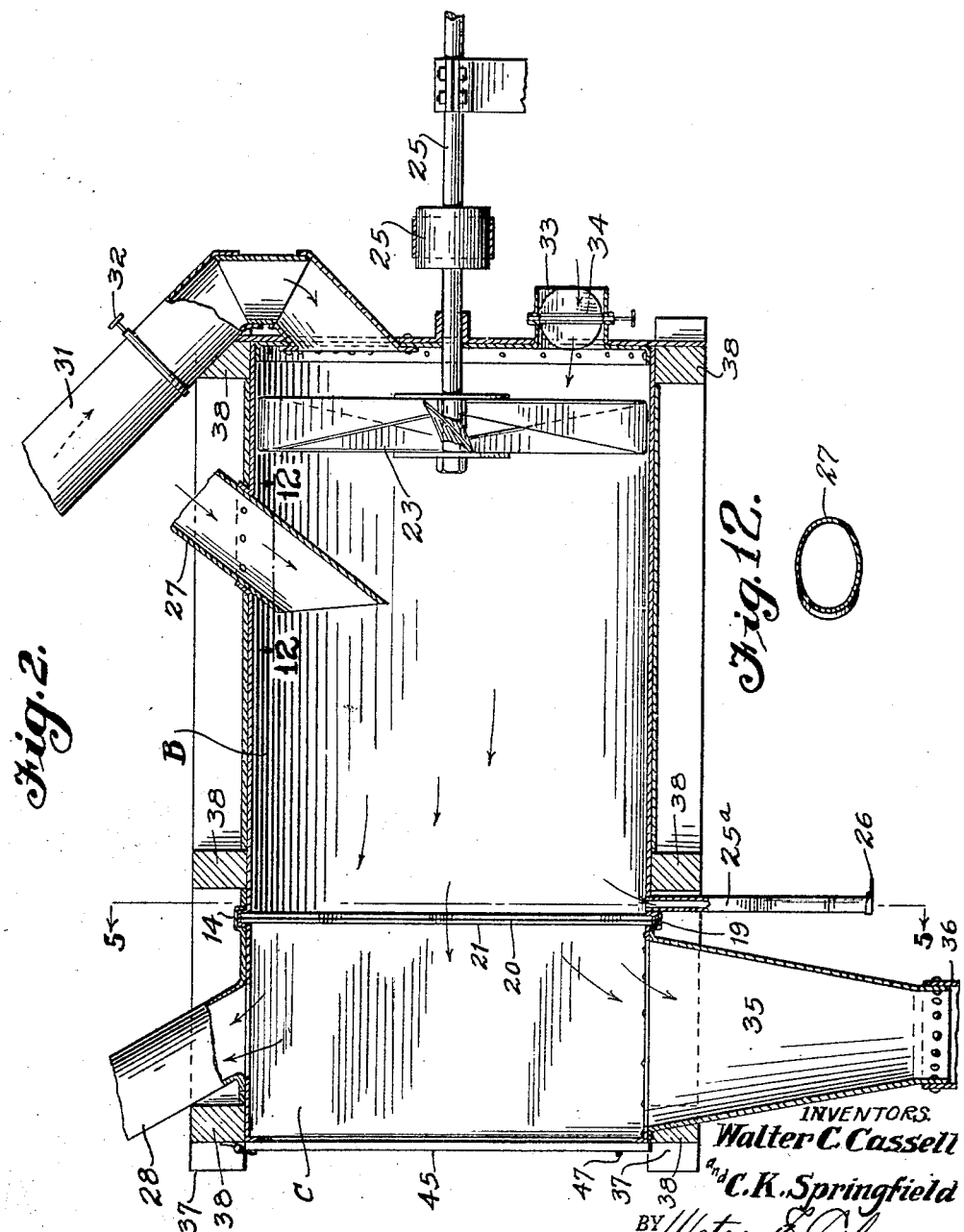

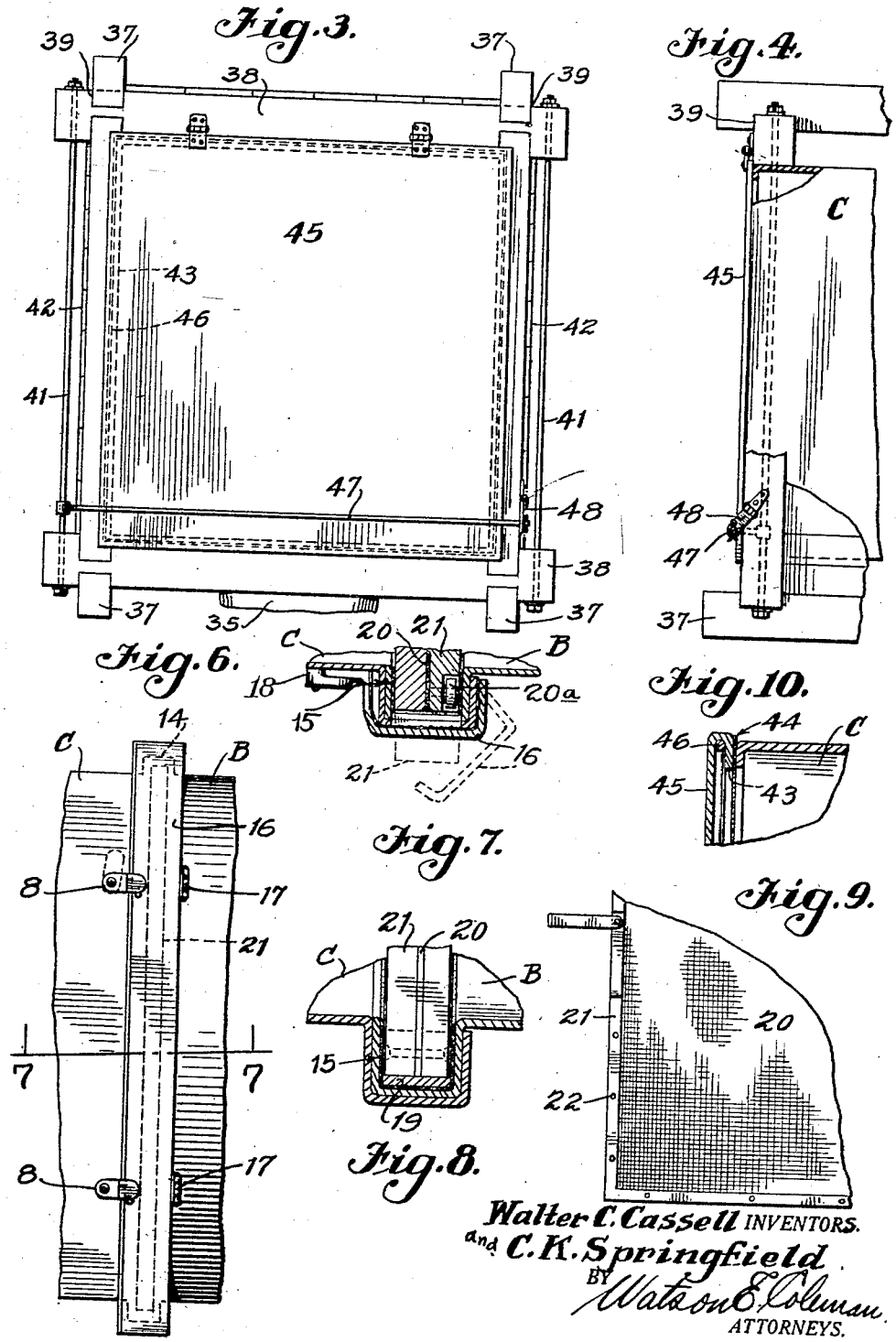

1,573,373

UNITED STATES PATENT OFFICE.

WALTER C. CASSELL AND CARL K. SPRINGFIELD, OF BRECKENRIDGE, TEXAS, ASSIGNORS OF ONE-HALF TO THE TEXAS CARBON INDUSTRIES, INC., OF BRECKENRIDGE, TEXAS, A CORPORATION OF DELAWARE.

PROCESS AND APPARATUS FOR BOLTING CARBON BLACK.

Application filed June 27, 1925. Serial No. 40,045.

*To all whom it may concern:*

Be it known that we, WALTER C. CASSELL and CARL K. SPRINGFIELD, citizens of the United States, residing at Breckenridge, in the county of Stephens and State of Texas, have invented certain new and useful Improvements in Processes and Apparatus for Bolting Carbon Black, of which the following is a specification, reference being had to the accompanying drawings.

This invention relates to the bolting of carbon black to thereby separate the fine and perfect carbon black from the grit, burned black, scale and other foreign matter which, if present, injures the quality of the black.

The usual method of bolting carbon black is to brush the black through screens set in horizontal planes, the brushing being secured by a number of fiber brushes revolving on a spider and having a vertical axis. This system has a number of serious disadvantages and is very wasteful and expensive to operate. Carbon black is not only exceedingly light and powdery but has a certain lubricating quality similar to graphite, and hence is very hard to pass through a fine mesh screen, these revolving brushes having a tendency to glaze the screen over after a short time and it is necessary to open up this type of bolter, pull out the screen pans and brush the screens. This means a considerable loss of good black, as the screen has to be cleaned every three or four hours. Furthermore, the brushes grind up and pulverize quite a large proportion of the grit and burned black and other waste matter which injures the quality of the black passing through the screens and ultimately a large amount of these impurities would be brushed therethrough, which renders such a system as this inefficient.

There have been many unsuccessful attempts to pass the black through a screen by air pressure but it has heretofore been impossible to keep the screen from clogging and the screen has heretofore only been kept from clogging by a system of rotary brushes and this requires constant cleaning of the screen. The efficiency of this type of mechanism, however, depends upon the assumption that all impurities in carbon black are heavier than the pure black, which is not the case, as burned black and some varieties of scale even are lighter in weight than pure black. However, these impurities, though lighter in weight, are considerably larger in size than particles of pure black and hence cannot pass through a small mesh screen unless ground up. The use of brushes for the purpose of screening to a certain extent grinds up these foreign particles and this renders the black impure and of a lower grade.

The object of the present invention is to overcome these disadvantages and provide a method and a mechanism which will separate out all impurities, whether lighter or heavier, than the pure black, resulting in a much superior product.

A further object is to provide means for this purpose which entirely overcomes the difficulty in screen clogging and the necessity of constantly cleaning the screen and to provide for this purpose an air-tight chamber of the correct size and proportion through which a uni-directional air current is passed from a fan and which current has the same velocity over the entire surface of the screen so that not only the middle of the screen will be kept clear but the margins of the screen over an area equal to the diameter of the fan will be kept clear.

In carbon black plants the refined carbon black is carried to a bin, and it is an object of the present invention to provide for carrying the refined carbon black which drops to the bottom of the collecting chamber or hopper upward into said bin, carrying the air which has passed through the fan and which contains some carbon black also into the bin, provide for reducing the speed of the air in its passage to the bin to thereby cause the deposition of any carbon black which may be held by the air, and provide for the discharge of air which is occluded with the carbon black.

Carbon black in ordinary cases and with the ordinary methods of refining, after it passes into the bin, contains a large amount of air and is extremely flocculent, and one of the objects of the present invention is to provide means whereby this air may be discharged from the mass of carbon in the bottom of the bin and allowed to rise into the upper portion of the bin, and in this connection to provide means whereby this air in the upper portion of the bin may be carried back into the rear end of the bolting chamber behind the fan and carried off from the bin by means of a ventilating stack to thereby prevent any back pressure within the bolting chamber, as it has been found that any back pressure therein will act to cause a clogging of the screen and that it is necessary that the air shall pass through the bolting chamber with the least possible impediment.

A still further object is to provide means whereby the air passing into the upper portion of the bin from the bolting chamber, after passing through the screen and the air which passes out through said stack, may be caused to deposit the carbon particles so that none of the carbon may be lost, as the margin of profit is relatively small and it is necessary to conserve labor and carbon.

Another object is to provide a bolting apparatus of this character with a cylindrical chamber and a fan having a diameter approximately the same as the chamber so that a scouring action is set up over the surface of the chamber and a scouring action set up over the surface of the screen which keeps the chamber and the screen entirely clean of carbon black.

Still another object is to provide means whereby a controlled amount of air may be allowed to flow to the fan so that the fan may have sufficient air to function properly and at the same time no back currents or counter-currents be set up.

Other objects will appear in the course of the following description.

Our invention is illustrated in the accompanying drawings, wherein:—

Figure 1 is a diagrammatic elevation of the apparatus used in carrying out our method of preparing carbon black;

Figure 2 is a longitudinal vertical section through the bolting chamber and the collecting chamber;

Figure 3 is a front elevation of a portion of the construction shown in Figure 2;

Figure 4 is a fragmentary side elevation of the bolting chamber partly broken away and the frame therefor showing the means for locking the forward door;

Figure 5 is a sectional view on the line 5—5 of Figure 2;

Figure 6 is a side elevation of the adjacent ends of the bolting and collecting chambers showing the door by which the screen is removed;

Figure 7 is a section on the line 7—7 of Figure 6;

Figure 8 is a fragmentary vertical section through the bottom of the bolting and collecting chambers showing the screen frame in place;

Figure 9 is a fragmentary elevation of the screening frame showing the handle;

Figure 10 is a fragmentary section through the upper portion of the door and the adjacent portion of the collecting chamber;

Figure 11 is an elevation partly broken away of the lower end of the discharge outlet for the scale and foreign matter;

Figure 12 is a fragmentary section on the line 12—12 of Figure 2.

Referring to Figure 1, which illustrates the general plan of our machine, A designates a storage bin wherein the black after it has been bolted is passed and B designates the bolter generally. The bin is of any suitable construction and has, for instance, a length of approximately 22′ × 10′ cross sectional area. Extending upward from the bin A is a ventilating stack 10 for carrying off excess air which has in its length a settling chamber 11, the stack extending above this settling chamber, and disposed within this settling chamber is a baffle 12, V-shaped in form and extending upward, this baffle being supported by the legs 13.

The bolting chamber B is of air-tight sheet metal with soldered or riveted joints and the part B is cylindrically formed. Just forward of this part B is a compartment C which is really part of the bolting chamber but which is separated from the bolting chamber by a screen, the construction of which will be now described. This part C, however, is preferably rectangular in cross section. At the junction of the chambers B and C and extending around the four sides is a channel 14 designed to receive the screen. This channel 14 is lined with felt 15 and on one side this channel is open and this seat or screen space is normally closed by means of a galvanized iron door or cover 16 which is hinged at 17 to the wall of the chamber A and held closed by means of latches 18.

The bottom of the channel within which the screen is disposed carries a flat iron bar 19 upon which the screen is adapted to rest and slide. The screen is provided with a swinging handle 20ª and when it is desired to remove the screen, the cover or door is opened and the screen pulled laterally outward and then inserted after cleaning. The screen 20 is mounted on a rectangular iron frame 21 and held thereto by bolts 22. The top and bottom edges, as well as the sides of the compartment or channel within which the screen is disposed, are lined with felt 15, as before stated, so that when the screen is in place no carbon black or solid matter of any kind can sift around the perimeter of the screen frame but all material must pass through the screen itself.

Disposed at the opposite end of the chamber B from the screen 20 is a revolving fan 23. This is mounted upon a shaft 24 which extends out through the rear end of the bolting chamber and carries upon it the pulley 25 whereby it may be driven. This fan has a diameter equal to the diameter of the cylindrical chamber B and is of such form as to cause a blast of air to be driven forward through the screen C with equal force at all points of the screen. Just rearward of the screen C the chamber B is formed at its bottom with a downwardly extending scale collecting hopper 25$^a$ whose opening extends entirely across the chamber B so that any scale or other foreign matter or impurities which strike the screen will drop down and be collected in this collecting chamber 25. The bottom of this collecting chamber or scale hopper 25 is closed by a port 26 which, when open, permits the removal of scale or other impurities which may have collected in this chamber. Entering the chamber B is a pipe 27 which carries the carbon black down into chamber B.

Extending from the chamber C to the top of the bin A is a duct or pipe 28 which conveys the air passing into the chamber C through the screen up into the duct portion of the chamber A. This air carries with it a certain amount of the fine black particles, and in order to separate the air from these particles the air is caused to strike against a baffle plate 29 which is mounted in the upper portion of the chamber. The air after it passes through the screen is reduced in speed and, of course, its passage up the flue 28 further reduces it in speed, as does its contact with the baffle 29, so that the air is not at a high speed when it passes into the bin A and as a consequence the air strikes against this baffle plate and the particles of black fall down into the bin. If air was only forced into the upper portion of the bin A, there would be an excess of air in this bin and in order to prevent that we carry a return pipe 30 from the top of the bin to the rear end of the bolting chamber B. This pipe has in it a damper 32 whereby the passage of air through this pipe 31 may be controlled. This pipe enters the chamber B behind the fan 23 and the air is once more carried through the fan and forced through the screen. An air inlet 33 is also provided by which a certain amount of air may enter the chamber B behind the fan sufficient to supply the fan with all the air that it needs. This air inlet duct 33 is provided with a damper 34 whereby the amount of air passing through this duct to the fan may be controlled. Immediately in front of the screen and disposed beneath the entire bottom of the chamber C, which may be termed the collecting chamber is a hopper 35 into which the fine and pure carbon black falls after the air blast passes through the screen. A conveyor 35 of any suitable character carries this finely powdered black upward and discharges it into the bin A.

The chambers B and C, as before stated, are formed of sheet metal riveted or soldered together at the seams and this metallic chamber is disposed within a frame, as illustrated in Figure 1, composed of the four relatively large longitudinal timbers 37 and the transverse timbers 38 which have the same size as the longitudinal timbers. The timbers 37 and 38 whereby they cross are conjointly cut out, as at 39, so as to interlock with each other, the ends of the timbers projecting beyond each other. Supporting the transverse timbers 38 are the vertical timbers 40 which engage in notches in the transverse timbers, as shown. The transverse timbers project beyond the longitudinal timbers and the longitudinal timbers project beyond the transverse timbers and these projecting ends of the longitudinal and transverse timbers are connected by vertical bolts 41.

The vertical timbers 40 support sheathing 42 which is nailed thereto, so as to cover the sides and front of the frame.

The forward end of the chamber C is formed with an inwardly turned flange 43 lined with felt 44 and hinged to the adjacent cross beam 38 is the cover 45 which is made of metal and has its margin turned over a rod 46 which acts to stiffen the cover. This cover is held closed by a hinged bar 47 hinged upon the adjacent bolt 41 extending across the cover and held in place by a keeper 48. This cover permits access to be had to the chamber C for the cleaning of said chamber from time to time or whenever it becomes necessary, though, as a matter of fact, practice has shown that the interior face of the cylindrical chamber B is kept very clean by the scouring action of the air.

Experiments have shown that it is absolutely necessary that there should be, as far as possible, an unobstructed passage of the air through the bolting chamber B and that the air should flow in a stream not only through the central portion of the chamber but through the peripheral portion of the chamber too. The pipe 27 is circular in cross section but if this pipe 27 is directed straight downward the forward flow of the air would become so obstructed that back pressure is set up and as a consequence the screen clogs and the air with the finely divided particles of carbon are forced out through the opening 33. We have found, however, in actual practice that it is necessary that the pipe 27 shall be disposed at an angle so that any cross section of the pipe taken on a horizontal plane will be either the sector of an ovoid figure or a complete and proper oval. This permits the blast of air to pass around this pipe smoothly and without breaking the continuity of the air stream. It is believed that the air stream causes the particles of carbon which will discharge at an angle to the air stream to take a whirling course in their passage through the chamber B and through the screen so that in a sense the air acts somewhat as the brushes would in causing the passage of the fine particles of carbon through the screen but without causing any glazing of the screen and consequent clogging of the screen, as is the case with the brushes.

An important feature of the invention resides in the provision of an agitator 49 in the storage bin. This agitator turns over and agitates the mass of fine carbon particles in the lower portion of the bin and the air which is held captive by these fine particles is discharged therefrom and passes into the upper portion of the storage bin. This permits a greater amount of carbon to be packed in the sacks than would be otherwise possible.

Another feature of the invention upon which stress must be laid is due to the necessity of preventing any possible back pressure within the bolting chamber or within the collecting compartment C. The air in the upper portion of the storage bin contains a certain amount of floating carbon black. By providing the pipe 31, an excess of pressure in the storage bin is relieved and the fine black which floats within this air is carried back and again passed through the bolting chamber so that considerable black is saved in this manner, but in case this pipe 31 is not sufficient to prevent any excess pressure in the storage bin we have provided the ventilating stack 10. The excess pressure is entirely relieved by this stack and at the same time the fine carbon particles which would be carried by the upward moving column of air are caught by the baffle 12 and discharged back in the bottom of the settling box. The distance between the lower edge of this baffle 12 and the bottom of the settling box is such that obstruction caused by the collection of the carbon black at the lower corners of the settling box is at all times prevented for the reason that while there will be a collection of carbon black at this point and entirely around the settling box, the black will settle at a critical angle and will sift down gradually into the stack and thus back into the storage bin, while the air will pass on and out through the ventilator at the upper portion of the settling box.

We have also found it necessary in actual practice to provide a vertical baffle at the point, as for instance 29, against which the air passing up through the pipe 28 discharges, as if, for instance, horizontal baffles are used either in the settling box carried by the stack 10 or in the upper portion of the storage bin, the fine carbon black will collect upon these horizontal baffle plates. In order to prevent this the baffle plate 29 is disposed vertically and the baffle 12 disposed at such an angle that the particles will slide downward and into the bottom of the settling box.

With this construction, the bolting apparatus is enclosed entirely within a heavy wooden frame so that it cannot be damaged, no leaks can occur, and thus no dust can pass by any chance. It will be seen that in this air bolter the difficulty of screen separating has been overcome by designing an air-tight chamber of the correct size and proportion so that as no back pressure is formed, the air current has a uni-directional flow and when passing through the screen has the same veloctiy over the entire surface of the screen. It may be stated that these air bolters have been in operation for approximately six months and in many cases operate continuously night and day for two weeks at a time without interruption of any sort, and that the screen at the end of this period showed no signs of clogging. It may be also stated that one bolter of this type having a screening area of forty-three inches square will pass more carbon black than two bolters of the brush type, each one having the same amount of screening area.

We claim:—

1. A method of preparing carbon black which consists in blowing the carbon black in a finely divided condition through a screen sufficiently fine to prevent the scale, foreign matter and burned particles from passing through but permit carbon black to pass, carrying the black after passing through the screen to a bin, separately carrying the air passing through the screen to the bin at the top thereof, causing the separation of the black from said air, and carrying away excess air from the bin to avoid back pressure.

2. A method of preparing carbon black which consists in blowing the carbon black in a finely divided condition through a screen sufficiently fine to prevent scale, foreign matter and burned particles from passing therethrough, allowing the black to settle after passing through the screen, carrying the black to a bin, carrying the air passing through the screen to the same bin at the top thereof, causing the separation of the black in said air from the air, and carrying the excess air from the bin back through the screen.

3. A method of preparing carbon black which consists in discharging the carbon black into a chamber in which a uni-directional blast of air is passing and having a screen extending at right angles to the axis of the blast of air, the screen being sufficiently fine to prevent scale, foreign substances and burned particles from passing therethrough, permitting the black to settle after passing through the screen, carrying the black to a bin, carrying the air passing through the screen to the same bin at the top thereof, causing the separation of the black from said air, and returning the air from the bin back to the chamber and passing it again through said fan.

4. An apparatus for separating carbon black from foreign matter comprising a chamber having at one end a fan, discharging a uni-directional blast of air longitudinally through the chamber, the chamber having a receiving opening for the carbon black disposed immediately in advance of the fan, a screen extending across said chamber adjacent one end thereof, a collecting hopper for foreign matter disposed adjacent the screen and between the screen and fan, the chamber on the opposite side of the screen forming a collecting chamber and having a hopper in its bottom to receive the carbon black, a bin, means for carrying the carbon black from said hopper to said bin, an air discharge flue extending from the top of said collecting chamber into the top of the bin, means therein for separating the carbon black from the air passing through said flue, and a flue from the top of the bin carrying the excess air from the bin back to the chamber in advance of the fan thereof, said chamber being formed with an air inlet opening, the flue from the bin and the inlet opening both being provided with means for controlling the passage of air into the chamber.

5. An apparatus for the purpose of separating carbon black from foreign matter comprising a cylindrical chamber and a collecting chamber separated from the cylindrical chamber by a finely divided screen, a fan at one end of the cylindrical chamber driving a blast of air toward and through said screen, means for discharging carbon black into the cylindrical chamber in advance of the fan, regulatable means for permitting the air to enter the chamber at the rear of the fan, a hopper disposed in the bottom of the collecting chamber, a receiving chamber disposed immediately in advance of the screen, a bin, means for conveying the carbon black from said hopper to the bin, a flue for carrying the air from the upper portion of the collecting chamber into the upper portion of said bin, a baffle at the entrance of the flue to the bin, detaining the air and permitting the carbon particles therein to settle, a return flue extending from the top of the bin to the rear end of the cylindrical chamber, said flue having means for regulating the passage of air therethrough, and a flue extending from the top of the bin and having a baffle in its length permitting the exit of air but acting to detain and return particles of carbon.

6. An apparatus for preparing carbon black comprising a chamber having a fan at one end for causing a blast of air through the chamber, each wall of the chamber intermediate its ends being formed with a channel, the channel on one side of the chamber being open, a cover hinged to the open side of the channel and normally closing the same, the inner face of the channel and the inner face of the door being lined with fabric, a screen disposed within said channel and through which the air blast passes, the chamber immediately in advance of the channel being formed with a downwardly extending collecting hopper for the collection of foreign matter held back by the screen, a collecting hopper extending down from said chamber on the opposite side of the screen from the fan, and an air outlet from the chamber.

7. An apparatus for bolting carbon black comprising a chamber having a fan in one end thereof and an air inlet provided with a valve, a screen extending through said chamber and through which the air passes, means for admitting carbon black to the chamber immediately in advance of the fan, a collecting hopper disposed beneath that portion of the chamber on the other side of the screen, a door normally closing the end of said chamber whereby access may be had to the interior thereof, a bin, means for carrying the carbon black from said hopper to said bin and discharging it thereinto, a flue extending from the upper portion of said chamber behind the screen into the upper portion of the bin, a baffle restricting the passage of the air and permitting the carbon particles therein to fall, and a return flue extending from the upper portion of the bin to the rear of the chamber and discharging thereinto and having a valve.

8. An apparatus for bolting carbon black including a bolting chamber having a finely divided screen intersecting the chamber, a fan having a diameter approximately that of the chamber and causing an air blast longitudinally through the entire cross sectional area of the chamber and through the entire area of said screen, means for discharging carbon black into said chamber in front of the fan and means for collecting the carbon black which has passed through said screen.

9. An apparatus for bolting carbon black including a bolting chamber having a finely divided screen intersecting the chamber, means for causing a column of air having a cross sectional area substantially the same as the cross sectional area of the bolting chamber to move longitudinally through said chamber in one direction and through the entire area of said screen, means for discharging carbon black into said chamber in front of the screen, and means for collecting the carbon black which has passed through said screen.

10. An apparatus for bolting carbon black including a storage bin, a bolting chamber having a screen, means for causing the movement of a column of air longitudinally through the bolting chamber and through the screen, means for discharging carbon black into said air column in front of the screen, means for collecting the screened carbon and discharging it into the bin, means for carrying the air after it passes through the screen into the upper portion of the bin, means for agitating the contents of the bin to thereby separate the air from the carbon black, and means for carrying excess air out of said bin to thereby prevent back pressure in the bolting chamber.

11. An apparatus for bolting carbon black including a storage bin, a bolting chamber having a screen, means for causing the movement of a column of air longitudinally through the bolting chamber and through the screen, means for discharging carbon black into said air column in front of the screen, means for collecting the screened carbon and discharging it into the bin, means for carrying the air after it passes through the screen into the upper portion of the bin, means for agitating the contents of the bin to thereby separate the air from the carbon black, and means for carrying air from the upper portion of the bin back into the bolting chamber.

12. An apparatus for bolting carbon black including a storage bin, a bolting chamber having a screen, means for causing the movement of a column of air longitudinally through the bolting chamber and through the screen, means for discharging carbon black into said air column in front of the screen, means for collecting the screened carbon and discharging it into the bin, means for carrying the air after it passes through the screen into the upper portion of the bin, means for agitating the contents of the bin to thereby separate the air from the carbon black, means for carrying excess air out of the bin to thereby prevent back pressure including a stack having a settling box in its length, and a baffle disposed within the settling box and acting to retard the passage of air and cause the separation of the particles of carbon therefrom.

13. An apparatus for bolting carbon black including a bolting chamber having a finely divided screen intersecting the chamber, a fan at the rear of the chamber having a diameter approximately that of the chamber and causing an air blast longitudinally through the chamber and through said screen, and means for discharging carbon black into the chamber in front of the fan including a downwardly and forwardly directed pipe, any section of the pipe on a horizontal plane being an ovoid or sector therof.

14. A method of treating carbon black which consists in blowing the carbon black in a finely divided condition through a screen sufficiently fine to prevent scale, foreign matter and burned particles from passing therethrough, carrying the black after it passes through the screen to a bin, carrying the air passing through the screen to the bin at the top thereof, agitating the carbon black within the bin to thereby separate the air therefrom, and carrying away excess air from the bin to avoid back pressure in the said chamber.

In testimony whereof we hereunto affix our signatures.

WALTER C. CASSELL.
CARL K. SPRINGFIELD.